(12) United States Patent
Davis

(10) Patent No.: US 7,968,777 B1
(45) Date of Patent: Jun. 28, 2011

(54) GUIDE FOR STRINGED INSTRUMENT AND METHOD

(76) Inventor: Jon M. Davis, New Smyrna Beach, FL (US)

(*) Notice: Subject to any disclaimer, the term of this patent is extended or adjusted under 35 U.S.C. 154(b) by 36 days.

(21) Appl. No.: 12/586,311

(22) Filed: Sep. 21, 2009

(51) Int. Cl.
*G10D 1/08* (2006.01)
(52) U.S. Cl. .......................................... 84/267
(58) Field of Classification Search ............ 84/267, 84/281, 291, 280
See application file for complete search history.

(56) References Cited

U.S. PATENT DOCUMENTS

| | | |
|---|---|---|
| 2,918,838 A | 12/1959 | Worrel |
| 3,451,302 A | 6/1969 | Lamart |
| 3,724,314 A | 4/1973 | Columbo |
| 4,739,689 A | 4/1988 | Cacioppo et al. |
| 4,765,608 A | 8/1988 | Bonasera |
| 2008/0190262 A1 | 8/2008 | Woodhouse |
| 2008/0271585 A1 | 11/2008 | Jones |

FOREIGN PATENT DOCUMENTS

DE 3106966 A * 9/1982 ............... 84/290

* cited by examiner

*Primary Examiner* — Kimberly R Lockett
(74) *Attorney, Agent, or Firm* — Paul S. Rooy PA

(57) ABSTRACT

A guide for stringed instrument and method. The guide comprises a mast slidably and rotatably attached to a clamp, an arm slidably and rotatably attached to and end of the mast opposite the clamp, and an up-stop rigidly attached to an end of the arm opposite the mast. Padding may be attached to the clamp to cushion the attachment between the clamp and a stringed plucked instrument. Method steps included removably attaching the clamp to a stringed instrument, setting a height of the up-stop over the instrument strings to substantially equal the sum of a player's middle finger distal phalangeal joint length plus the player's middle finger middle phalangeal joint length, positioning the player's index and middle fingers substantially under the up-stop, and plucking the strings. The guide may also be used to properly position a bow in a rest position, resting against the up-stop, pending being used to play the instrument.

14 Claims, 4 Drawing Sheets

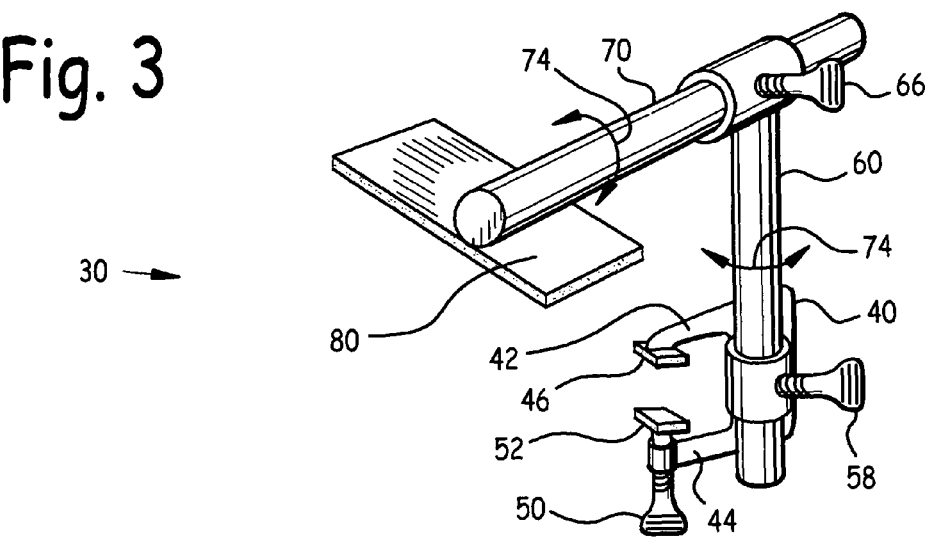
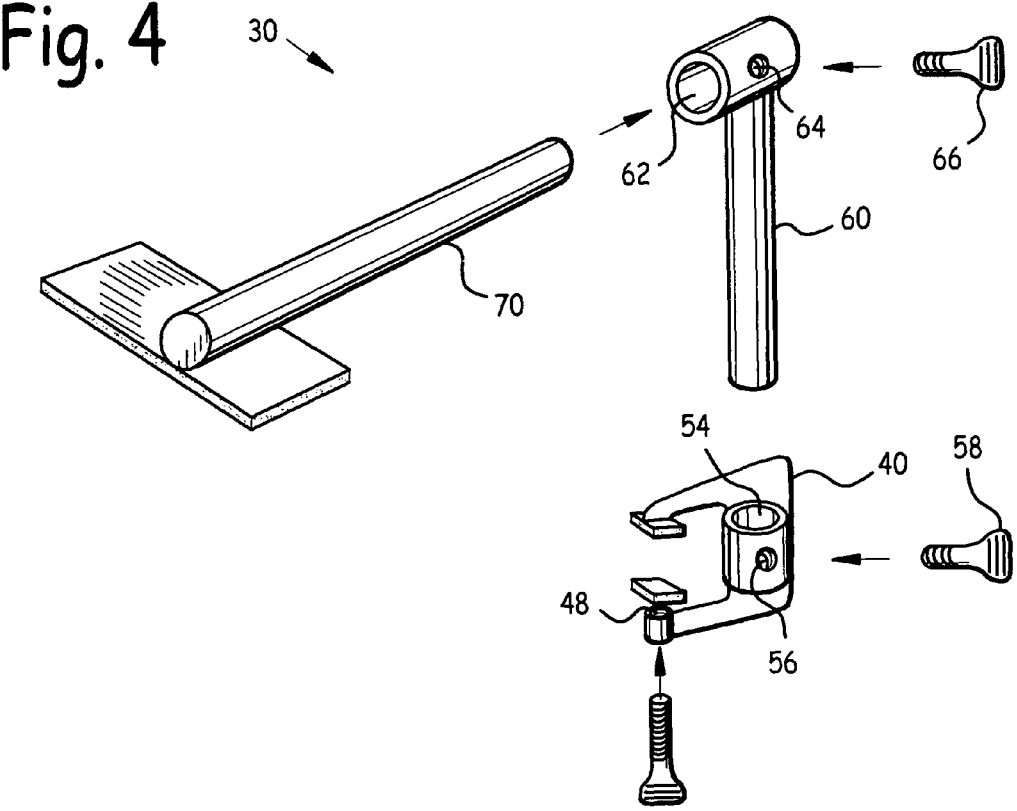

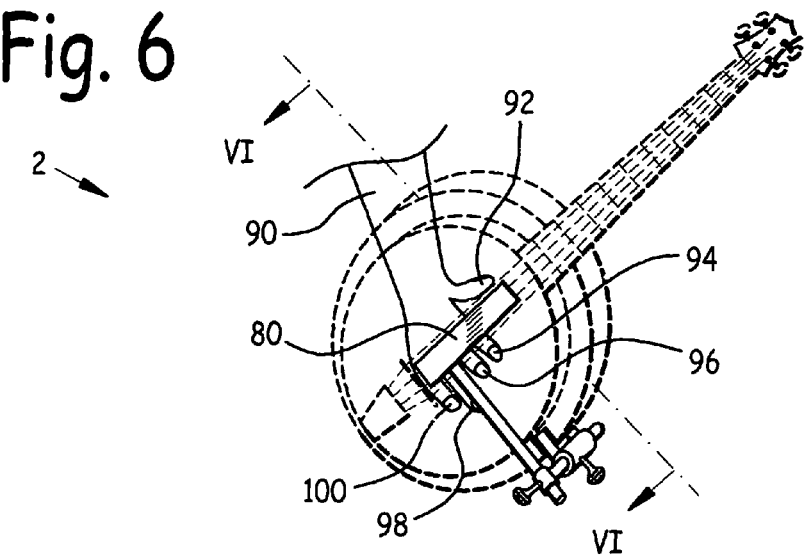
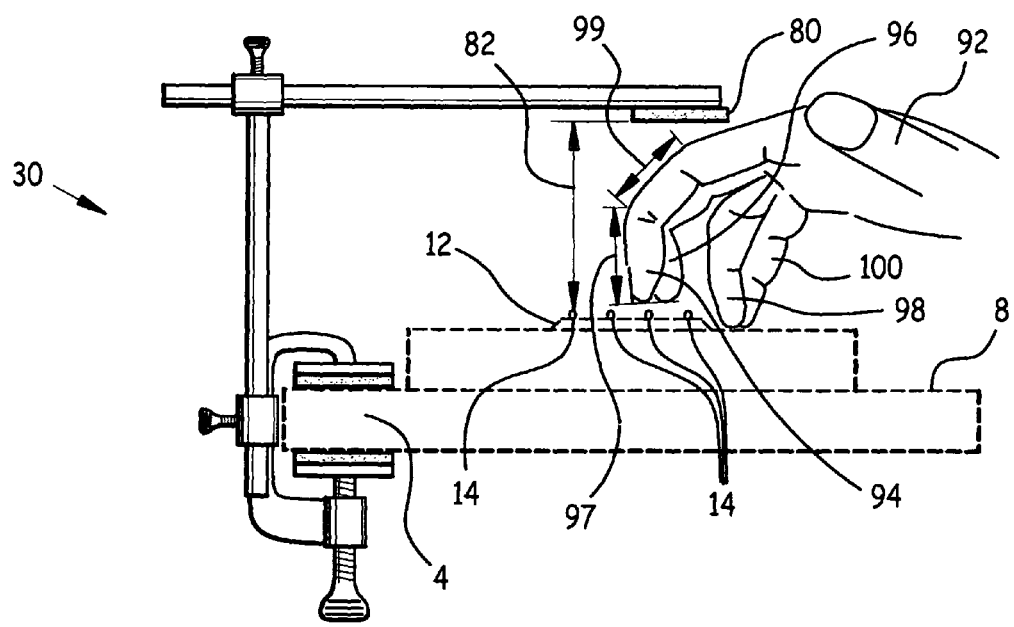

GUIDE FOR STRINGED INSTRUMENT AND METHOD

BACKGROUND OF THE INVENTION

1. Field of the Invention

This invention relates to stringed instruments, and in particular to a guide for stringed instrument and method.

2. Background of the Invention

The banjo is a plucked string instrument, popular for its clear, bell-like sound. It's name can be traced back to the "banjar", an African string instrument. Some etymologists believe the name is a particular pronunciation of the term "bandore", though recent studies suggests that the name started out as a Senegambian term for the bamboo stick used for the instrument's neck.

Modern banjos are available in a number of different versions, including four- and five-string models. Because of the rapid decay in sound when plucked, banjo sound sustains poorly, and for this reason must be played in a fast strumming or arpeggiation by the plucking hand. Banjos are thus referred to as "the fastest instrument out there".

Major banjo components include a wooden or metal rim with a plastic or leather head (drumhead) stretched across it, a neck mounted on the side of the rim, a tailpiece attached to the rim opposite the neck, four or five strings, and a neck with a fingerboard. The construction is typically wooden, with combinations of maple, walnut, and ebony for fingerboards, pegheads, and the tops of bridges.

The earliest banjos didn't have frets (that is, they were unfretted), but most banjos today do have frets. The banjo strings themselves are generally metal, although nylon and gut are also used occasionally. Current banjo designs include resonator banjos (which have a detachable chamber, or resonator, on the back of the rim), and open back banjos, which don't.

Several popular styles are used to play the banjo in various forms of music. In bluegrass music, which uses the five-string resonator banjo extensively, it is often played in Scruggs style named after Earl Scruggs, melodic or Keith style, or two-finger style also called Reno style named after Don Reno. In these styles the emphasis is on arpeggiated figures played in a continuous eighth-note rhythm.

American Old-time music typically uses the five-string open back banjo. It is played in a number of different styles, the most common of which are called claw-hammer (or "clawhammer") and frailing, both characterized by the use of a downward rather than upward motion when striking the strings with the fingers. Frailing techniques utilize the thumb to catch the fifth string for a drone after each strum, or the thumb is used to pick out additional melody notes in what is known as 'drop-thumb'.

Because of the rapid arpeggiation required to play the banjo, it is extremely important to have the plucking hand in the correct position and height over the strings. For example, the index finger should ideally be located approximately ¼ inch off the strings when not plucking them. This creates a problem, because the natural position for the index finger is one to two inches above the strings, an incorrect location referred to by savvy banjo players as "fly away finger".

Thus, it would be desirable to provide an apparatus and method to teach students of stringed instruments to maintain their plucking hands in a position which places the plucking fingers around ¼ inch from the strings, and prevents "fly away finger".

Existing Designs

Traditionally, banjo players have practiced for years to teach their muscles the muscle memory required to position their plucking fingers in the correct rest position over the strings. A major disadvantage associated with this approach is the large amount of time required to teach the student the correct technique and hand position. Thus, it would be desirable to provide an apparatus and method which would teach correct hand position more effectively.

SUMMARY OF THE INVENTION

Accordingly, it is an object of the present invention to provide a guide for stringed instrument and method which positions the player's hand correctly to play the instrument. Design features allowing this object to be accomplished include an up-stop held at a pre-determined distance above instrument strings by an arm adjustably attached to a mast, which in turn is adjustably attached to a clamp. Advantages associated with the accomplishment of this object accelerated learning, and prevention of "fly-away finger".

It is another object of the present invention to provide a method of use for provide a guide for stringed instrument which positions the player's hand correctly to play the instrument. Method steps allowing this object to be accomplished include: A. providing an up-stop held at a pre-determined distance above instrument strings by an arm adjustably attached to a mast, which in turn is adjustably attached to a clamp, B. clamping the apparatus to the stringed instrument, C. positioning the up-stop at a height above the instrument strings substantially equal to the summed lengths of the player's middle phalangeal joint and distal phalangeal joint, and D. placing the player's plucking hand beneath the up-stop. Advantages associated with the accomplishment of this object accelerated learning, and prevention of "fly-away finger".

It is another object of the present invention to provide a method of use for provide a guide for stringed instrument which positions a bow correctly to play the instrument. Method steps allowing this object to be accomplished include: A. providing an up-stop held at a pre-determined distance above instrument strings by an arm adjustably attached to a mast, which in turn is adjustably attached to a clamp, B. clamping the apparatus to the stringed instrument, C. positioning the up-stop at a height above the instrument strings at the correct position to rest a bow against pending bow use, and D. placing the bow beneath the up-stop, poised over the strings. Advantages associated with the accomplishment of this object accelerated learning, and faster teaching of proper resting bow position.

It is yet another object of this invention to provide a guide for stringed instrument which is inexpensive to produce. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIGS. 1 and 2. Sheet two contains FIGS. 3 and 4. Sheet three contains FIG. 5. Sheet four contains FIGS. 6 and 7.

FIG. 3 is a front quarter view of a guide.

FIG. 4 is a front quarter exploded view of a guide.

FIG. 6 is a top isometric view of a guide clamped onto a stringed instrument, with a player's hand beneath the up-stop.

FIG. 7 is a front view of a guide clamped onto a stringed instrument, with a player's hand beneath the up-stop.

DETAILED DESCRIPTION OF THE PREFERRED EMBODIMENT

The instant guide for stringed instrument and method is intended to be usable with any appropriate stringed instrument, including but not limited to banjos, mandolins, guitars, ukuleles, violins, violas, cellos, bases, etc. In addition, the instant guide for stringed instrument and method is useable to hold resting bows used in bowing stringed instruments at the proper height above an instrument's strings.

For illustrative purposes, the instant figures depict the guide for stringed instrument and method used in conjunction with a banjo, with the guide for stringed instrument clamped to the banjo resonator. The guide for stringed instrument and method are as easily used with other stringed instruments with the guide clamped to appropriate elements of such stringed instruments, e.g. the body of a guitar, ukulele, mandolin, or other stringed instrument.

Figure 1:
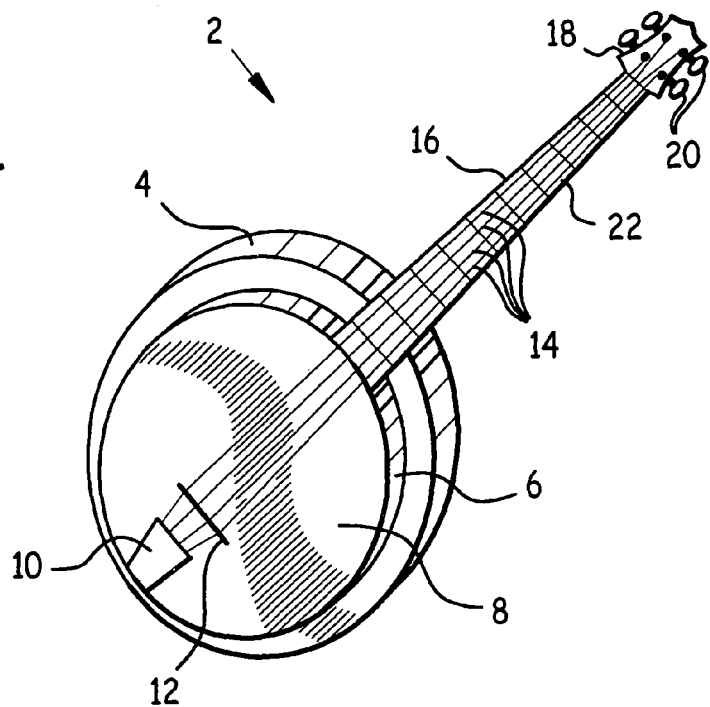
FIG. 1 is a top isometric view of a prior art stringed instrument.

FIG. 1 is a top isometric view of a prior art stringed instrument. In the illustrations, the stringed instrument is a banjo 2, comprising a neck 16 attached to a tone ring and resonator. The neck has. fretboard 22 over which strings 14 pass, peghead 18, and tuning pegs 20. Head 8 is stretched over tone ring 6, and bridge 12 rests on head 8. Tension tailpiece 10 secures the ends of strings 14 opposite peghead 18. Resonator 4 forms a sound box, which together with head 8 and tone ring 6 amplifies the sound of strings 14.

Figure 2:
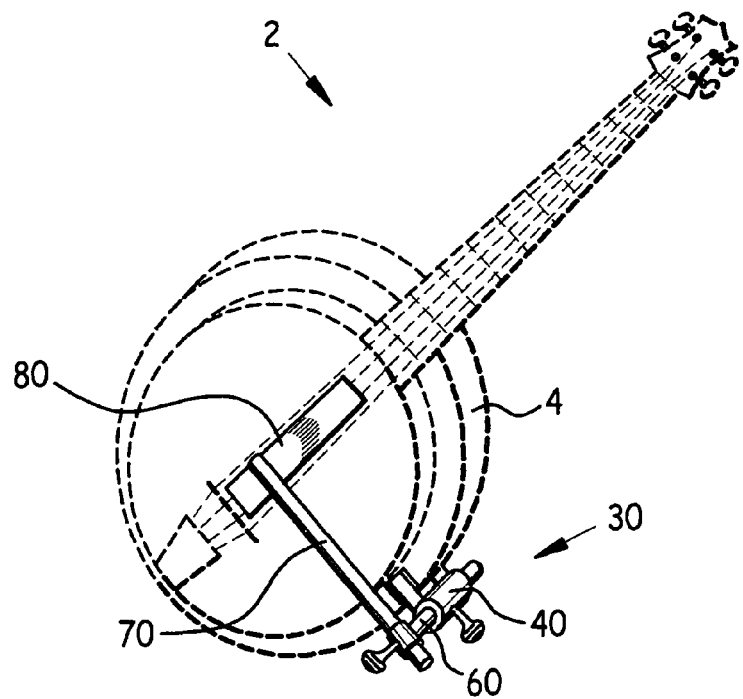
FIG. 2 is a top isometric view of a guide clamped onto a stringed instrument.

FIG. 2 is a top isometric view of guide 30 clamped onto resonator 4 of banjo 2. Guide 30 comprises clamp 40, mast 60 adjustably attached to clamp 40, arm 70 adjustably attached to mast 60, and up-stop 80 rigidly attached to and end of arm 70 opposite mast 60.

The adjustable attachment between clamp 40 and mast 60, and between arm 70 and mast 60, embraces slidability and rotation. Mast 60 is slidably attached to clamp 40, and arm 70 is slidably attached to mast 60, as indicated by arrows 72 in FIG. 5. Mast 60 is rotatably attached to clamp 40, and arm 70 is rotatably attached to mast 60, as indicated by arrows 74 in FIG. 4.

FIG. 3 is a front quarter view of guide 30. FIG. 4 is a front quarter exploded view of guide 30. As may be observed in these figures, clamp 40 comprises an upper jaw 42 and substantially parallel and co-planar lower jaw 44. Upper jaw pad 46 is attached to an end of upper jaw 42 opposite mast 60.

Lower jaw threaded bore 48 is disposed at an end of lower jaw 44 opposite mast 60, and is sized to mate with lower jaw screw 50, and lower jaw pad 52 is disposed at end of lower jaw screw 50 closest to upper jaw pad 46.

Figure 5:
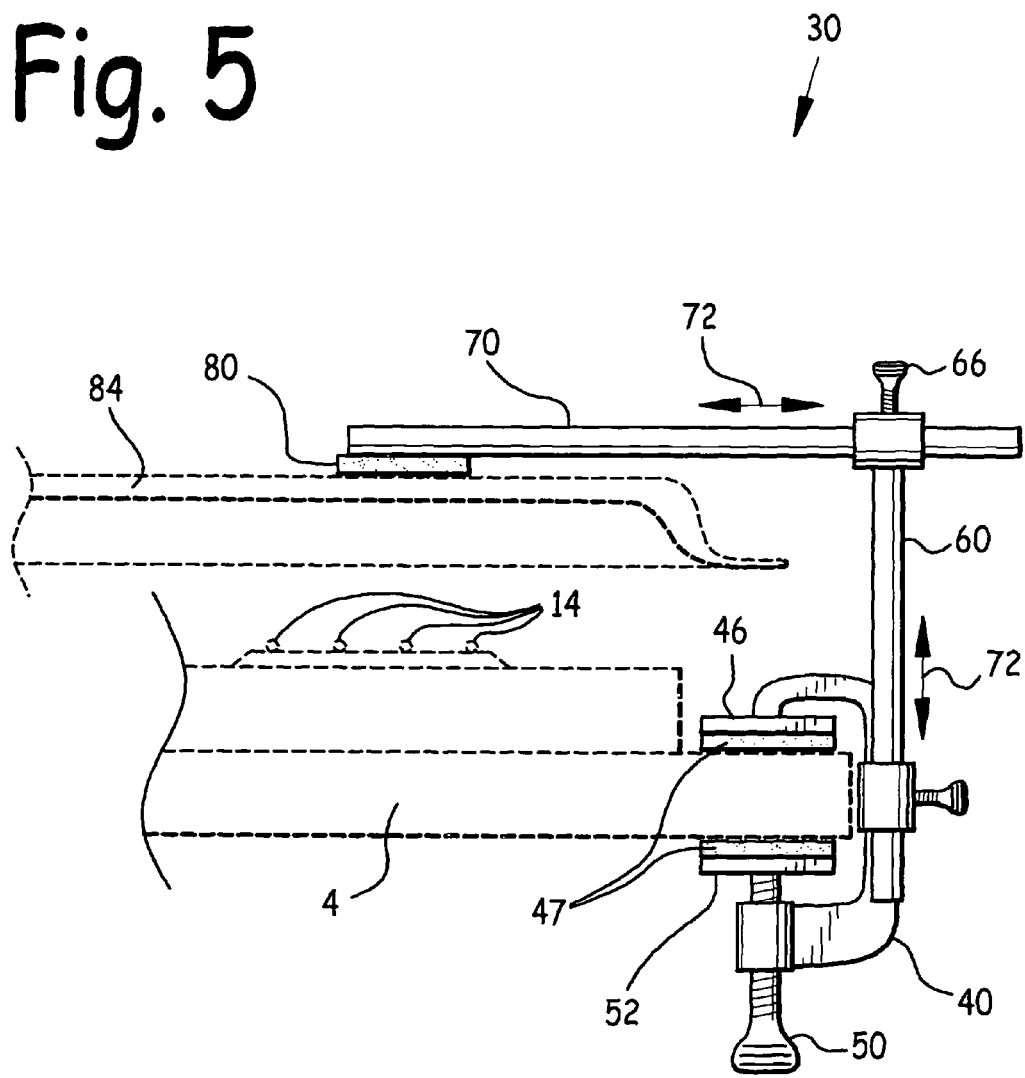
FIG. 5 is a front view of a guide removably attached to a stringed instrument, whose up-stop is being used to properly position a bow in the bow resting position, pending use.

FIG. 5 is a front view of guide 30 removably attached to resonator 4. When resonator 40 is placed between upper jaw pad 46 and lower jaw pad 52, lower jaw screw 50 may be turned within lower jaw threaded bore 48 in order to removably attach clamp 40 to resonator 4 of banjo 2. In like fashion, clamp 40 may be removably attached to the body of any appropriate stringed instrument by placing the stringed instrument body between upper jaw pad 46 and lower jaw pad 52, and tightening lower jaw screw 50.

As may be observed in FIG. 5, padding 47 may be attached to the sides of upper jaw pad 46 and lower jaw pad 52 which face each other, to protect the stringed instrument to which guide 30 is attached.

Mast 60 is slidably and rotatably attached to clamp 40 by clamp bore 54 in clamp 40, clamp threaded bore 56 communicating with clamp bore 54, and clamp screw 58 sized to mate with clamp threaded bore 56. Clamp bore 54 is sized to slidably and rotatably admit mast 60. Tightening clamp screw 58 within clamp threaded bore 56 has the effect of immobilizing mast 60 within clamp bore 54. Un-tightening clamp screw 58 within clamp threaded bore 56 has the effect of releasing, for rotation/and-or sliding motion, mast 60 within clamp bore 54.

Arm 70 is slidably and rotatably attached to mast 60 by mast bore 62 in mast 60, mast threaded bore 64 communicating with mast bore 62, and mast screw 66 sized to mate with mast threaded bore 64. Mast bore 62 is sized to slidably and rotatably admit arm 70. Tightening mast screw 66 within mast threaded bore 64 has the effect of immobilizing arm 70 within mast bore 62. Un-tightening mast screw 66 within mast threaded bore 64 has the effect of releasing, for rotation/and-or sliding motion, arm 70 within mast bore 62.

FIG. 5 depicts use of the instant guide 30 for stringed instrument whose up-stop 80 is being used to position a resting bow, 84 pending its use. When bow 84 is in use, it is in contact with one or more strings 14, typically reciprocating on strings 14 to cause these to vibrate in order to produce sound. When bow 84 is resting (not in use), as depicted in FIG. 5, it is important to hold bow 84 at the correct height above strings 14 so that bow 84 is in the correct position to resume play.

In order to act as a guide for bow 84, guide 30 can be clamped to a stringed bowed musical instrument as described previously, and up-stop 30 positioned at the correct height by using the slidable and rotatable attachments between clamp 40, mast 60 and arm 70. In use, bow 84 is lightly rested against up-stop 82 until its use is required, upon which bow 84 is placed in contact with the appropriate string(s) and play commenced.

FIG. 6 is a top isometric view of a guide 30 clamped onto a stringed instrument, with a player's hand beneath up-stop 80. FIG. 7 is a front view of a guide 30 clamped onto a stringed instrument, with a player's hand beneath up-stop 80.

As depicted in FIGS. 6 and 7, the stringed instrument shown is banjo 2. FIG. 7 depicts a popular playing style, which involves "anchoring" the player's ring finger 98 and pinkie 100 at a spot adjacent instrument strings 14. The fingers then used to pluck strings 14 are thumb 92, index finger 94, and middle finger 96, with or without the aid of finger picks. It is important to keep the player's ring finger 98 and pinkie 100 anchored as shown, in order to support the plucking action of thumb 92, middle finger 96, and index finger 94.

In use, guide 3Q is clamped to the instrument (resonator 4 of banjo 2 in this case). The adjustable attachments between mast 60 and clamp 40, and between arm 70 and mast 60, are then used to position up-stop 80 directly over strings 14, at a up-stop height 82 above strings 14. In the preferred embodiment, up-stop height 82 was substantially equal to the sum of middle finger distal phalangeal joint length 97 plus middle finger middle phalangeal joint length 99.

The player then moves his arm 90 so as to position index finger 94 and middle finger 96 substantially under up-stop 80. Because up-stop height 82 has been set to equal to the sum of middle finger distal phalangeal joint length 97 plus middle finger middle phalangeal joint length 99, the player's index finger 94 and middle finger 96 are held at the optimum height above strings 14 for optimum plucking action. This mechanical constraint provided by up-stop 80 serves to provide positive indication of proper hand positioning, and so accelerates the muscle learning required to properly pluck the stringed instrument.

Accordingly, the instant method comprises the steps of:

A. Providing a guide comprising a clamp, a mast adjustably attached to the clamp, an arm adjustably attached to the mast, and a up-stop rigidly attached to the arm;
B. Attaching the clamp to the body of a stringed instrument;
C. Using the adjustable attachment between the clamp, arm and mast, positioning the up-stop above the instrument strings at a height substantially equal to the sum of the player's middle finger distal phalangeal joint length plus the player's middle finger middle phalangeal joint length;
D. Positioning the player's index finger and middle finger substantially under the up-stop; and
E. Plucking the strings with the player's thumb, index finger, and middle finger.

In the preferred embodiment, up-stop 80, arm 70, mast 60, and clamp 40 were made of metal, synthetic, nylon, wood, or other appropriate material. Padding 47 was fiber, cork, textile, or other soft material appropriate to prevent damage to an instrument to which guide 30 is mounted.

While a preferred embodiment of the invention has been illustrated herein, it is to be understood that changes and variations may be made by those skilled in the art without departing from the spirit of the appending claims.

DRAWING ITEM INDEX

2 banjo
4 resonator
6 tone ring
8 head
10 tension tailpiece
12 bridge
14 string
16 neck
18 peg head
20 peg
22 fret board
30 guide
40 clamp
42 upper jaw
44 lower jaw
46 upper jaw pad
47 padding
48 lower jaw threaded bore
50 lower jaw screw
52 lower jaw pad
54 clamp bore
56 clamp threaded bore
58 clamp screw
60 mast
62 mast bore
64 mast threaded bore
66 mast screw
70 arm
72 arrow
74 arrow
80 up-stop
82 up-stop height
84 bow
90 arm
92 thumb
94 index finger
96 middle finger
97 middle finger distal phalangeal joint length
98 ring finger
99 middle finger middle phalangeal joint length
100 pinkie

I claim:

1. A guide for stringed instrument comprising an instrument neck attached to an instrument body, said guide comprising a clamp, a mast, an arm, and an up-stop, means of slidably and rotatably attaching said mast to said clamp, means of slidably and rotatably attaching said arm to said mast, means of removably attaching said clamp to said instrument body, said up-stop being rigidly attached to an end of said arm opposite said mast.

2. A guide for stringed instrument comprising a clamp; a mast; an arm; an up-stop; means of slidably and rotatably attaching said mast to said clamp; means of slidably and rotatably attaching said arm to said mast; and means of removably attaching said clamp to said instrument; said up-stop being rigidly attached to an end of said arm opposite said mast; said means of slidably and rotatably attaching said mast to said clamp comprising a clamp bore in said clamp sized to slidably and rotatably admit said mast, a clamp threaded bore communicating with said clamp bore, and a clamp screw sized to mate with said clamp threaded bore, said clamp screw bearing on said mast when said clamp screw is tightened.

3. The guide for stringed instrument of claim 2 wherein said means of slidably and rotatably attaching said arm to said mast comprises a mast bore in said mast sized to slidably and rotatably admit said arm, a mast threaded bore communicating with said mast bore, and a mast screw sized to mate with said mast threaded bore, said mast screw bearing on said mast when said clamp screw is tightened, said mast bore being disposed at an end of said mast opposite said clamp.

4. The guide for stringed instrument of claim 3 wherein said means of removably attaching said clamp to said instrument comprises an upper jaw, a lower jaw, an upper jaw pad at an end of said upper jaw opposite said mast, a lower jaw threaded bore at an end of said lower jaw opposite said mast, a lower jaw screw sized to mate with said lower jaw threaded bore, and a lower jaw pad at and end of said lower jaw screw closest said upper jaw pad, said lower jaw screw bearing on said lower jaw pad when said lower jaw screw is tightened.

5. The guide for stringed instrument of claim 4 further comprising padding attached to sides of said upper jaw pad and said lower jaw pad which face each other, whereby said padding cushions contact between said upper jaw pad and said lower jaw pad, and said instrument.

6. A method of use for a guide for stringed instrument comprising the steps of:

A. Providing a guide comprising a clamp, a mast adjustably attached to said clamp, an arm adjustably attached to an end of said mast opposite said clamp, and an up-stop rigidly attached to an end of said arm opposite said mast;
B. Removably attaching said clamp to a body of said stringed instrument;
C. Using said adjustable attachment between said clamp, said arm and said mast, positioning said up-stop above instrument strings at an up-stop height;
D. Positioning a player's index finger and middle finger substantially under said up-stop; and
E. Said player plucking said instrument strings.

7. A method of use for a guide for stringed instrument comprising the steps of:

A. Providing a guide comprising a clamp, a mast adjustably attached to said clamp, an arm adjustably attached to an end of said mast opposite said clamp, and an up-stop rigidly attached to an end of said arm opposite said mast;
B. Removably attaching said clamp to a body of said stringed instrument;
C. Using said adjustable attachment between said clamp, said arm and said mast, positioning said up-stop above instrument strings at an up-stop height;
D. Positioning a player's index finger and middle finger substantially under said up-stop;
E. Said player plucking said instrument strings; and
F. Positioning said up-stop at an up-stop height over said strings substantially equal to a sum of said player's middle finger distal phalangeal joint length plus said player's middle finger middle phalangeal joint length.

8. The method of use for a guide for stringed instrument of claim 7 comprising the further step of said player plucking said instrument strings using said player's thumb, said player's said index finger, and said player's said middle finger.

9. A guide for stringed instrument comprising a clamp, a mast, an arm, and an up-stop, means of slidably and rotatably attaching said mast to said clamp, means of slidably and rotatably attaching said arm to said mast, means of removably attaching said clamp to said instrument, said up-stop being rigidly attached to an end of said arm opposite said mast, said means of removably attaching said clamp to said instrument comprising an upper jaw, a lower jaw, an upper jaw pad at an end of said upper jaw opposite said mast, a lower jaw threaded bore at an end of said lower jaw opposite said mast, a lower jaw screw sized to mate with said lower jaw threaded bore, and a lower jaw pad at and end of said lower jaw screw closest said upper jaw pad, said lower jaw screw bearing on said lower jaw pad when said lower jaw screw is tightened.

10. The guide for stringed instrument of claim 9 wherein said means of slidably and rotatably attaching said arm to said mast comprises a mast bore in said mast sized to slidably and rotatably admit said arm, a mast threaded bore communicating with said mast bore, and a mast screw sized to mate with said mast threaded bore, said mast screw bearing on said mast when said clamp screw is tightened, said mast bore being disposed at an end of said mast opposite said clamp.

11. The guide for stringed instrument of claim 10 wherein said means of slidably and rotatably attaching said mast to said clamp comprises a clamp bore in said clamp sized to slidably and rotatably admit said mast, a clamp threaded bore communicating with said clamp bore, and a clamp screw sized to mate with said clamp threaded bore, said clamp screw bearing on said mast when said clamp screw is tightened.

12. The guide for stringed instrument of claim 11 further comprising padding attached to sides of said upper jaw pad and said lower jaw pad which face each other, whereby said padding cushions contact between said upper jaw pad and said lower jaw pad, and said instrument.

13. A method of use for a guide for stringed instrument comprising the steps of:
A. Providing a guide comprising a clamp, a mast adjustably attached to said clamp, an arm adjustably attached to an end of said mast opposite said clamp, and an up-stop rigidly attached to an end of said arm opposite said mast;
B. Removably attaching said clamp to a body of said stringed instrument;
C. Using said adjustable attachment between said clamp, said arm and said mast, positioning said up-stop above instrument strings at an up-stop height;
D. Positioning a bow between said up-stop and said strings, resting against said up-stop, whereby said bow is positioned over said strings at a correct height, pending being used to play the instrument.

14. The method of use for a guide for stringed instrument of claim 13 comprising the further steps of removing said bow from contact with said up-stop, putting said bow in contact with said strings, and using said bow to play said instrument.

* * * * *